/ Patented Feb. 26, 1946

2,395,453

UNITED STATES PATENT OFFICE 2,395,453

β-THIOCYANO KETONES AND METHOD FOR THEIR PREPARATION

Herman A. Bruson, Philadelphia, Pa., assignor to Röhm & Haas Company, Philadelphia, Pa., a corporation of Delaware No Drawing. Application February 26, 1944, Serial No. 524,089

9 Claims. (Cl. 260—454)

This invention relates to ketones which have a thiocyano group in the beta position in relation to the carbonyl group thereof. It also relates to a process for the preparation of said ketones.

Thiocyanation of organic compounds has heretofore been accomplished by replacement of a halogen atom or of a sulfate or phosphate ester group, by addition of thiocyanogen to both sides of a multi-bonded linkage of carbon atoms, and by addition of thiocyanic acid to certain unsaturated hydrocarbons having reactive double bonds, wherein there are used inert organic solvents at relatively low temperatures. It has generally been held impracticable to work with thiocyanic acid because it polymerizes at room temperature to a yellow insoluble compound, hydrolyzes readily in aqueous solutions, and can be handled only in dilute solutions, such as ether solutions, at low temperatures.

According to this invention, thiocyanic acid is liberated in an aqueous medium and is immediately reacted with an α,β-unsaturated ketone at a temperature above room temperature (about 25°–30° C.) up to about 100° C., under which conditions and at which temperatures the rate of addition of thiocyanic acid to the reactive ketone system is greater than the rate of polymerization and/or hydrolysis of thiocyanic acid. While such a procedure is apparently contrary to the holdings of the prior art, even at 90°–100° C. and in the presence of water only traces of polymer, if any, are encountered and very little hydrolysis results. Even in those cases where extreme susceptibility to cleavage would be expected, as, for example, in the case of β-tert. thiocyano ketones, good yields of the β-thiocyano product are obtained.

The process disclosed herein is applicable to a wide variety of cyclic and acyclic ketones having an olefinic linkage in a position which is α,β to the carbonyl group. More than one such double bond may be present in the ketone. The α,β-unsaturated ketones include aliphatic, arylaliphatic, cycloaliphatic, and hydroaromatic ketones. While ketones having the unsaturated group within a cycle may be used, the preferred class of ketones includes those having open chains. These are available in considerable variety and give saturated thiocyano ketones of a high degree of stability. Typical ketones which may be used are mesityl oxide, phorone, butylidene acetone, hexylidene acetone, heptylidene acetone, various branch-chained ketones, such as 5-ethyl-3-heptene-one-2, 5-ethyl-3-nonene-one-2, and homologues thereof, vinyl alkyl ketones, such as vinyl methyl ketone and vinyl ethyl ketone, ketones of the aromatic, arylaliphatic, and cycloaliphatic types having more complex structures than the open-chained ketones, such as styryl n-hexyl ketone, cyclohexylidene cyclohexanone, isophorone, and the like, and ketones having more than one functional or carbonyl group, such as $CH_3COCH_2CH_2CH_2COCH=CH_2$.

In effecting the reaction between an α,β-unsaturated ketone and thiocyanic acid by the method of this invention, as the source of the thiocyanate group there may be used an aqueous solution or suspension of a salt of thiocyanic acid. By way of example, there may be cited as suitable salts alkali thiocyanates, including lithium, sodium, or potassium thiocyanates, alkaline earth thiocyanates, such as calcium thiocyanate, or ammonium thiocyanate. One or more such salts may be used over a wide range of concentration. Dilute solutions up to super-saturated solutions may be employed.

To liberate thiocyanic acid from these salts, there may be used any strong, non-oxidizing acid over a considerable range of concentration. Acids such as hydrochloric, sulfuric, and phosphoric are particularly suitable and may advantageously be used at concentrations from 10% to 40%, although weaker and more concentrated solutions are also useful. The acid and salt are desirably used in equivalent proportions.

In carrying out the reaction, the salt and acid are gradually combined or mixed in the presence of an α,β-unsaturated ketone and water. The ketone may be stirred with an aqueous solution of the salt and acid added thereto, little by little. On the other hand, the salt or solution thereof may be added gradually to a stirred mixture of an α,β-unsaturated ketone and the acid.

The ketone may be added directly to a solution of acid or salt in water or in water and an organic solvent, particularly one miscible with water, such as acetone or ethyl alcohol. In the case of solid α,β-unsaturated ketones or highly viscous liquid ketones, it is often helpful to dissolve the ketone in a suitable organic solvent, such as alcohol or benzene, to facilitate better dispersion in the reaction medium.

The method of preparing β-thiocyano ketones according to this invention is illustrated by the following examples.

*Example 1*

A mixture of 147 parts of mesityl oxide, 160 parts of water, and 121.5 parts of sodium thiocyanate was stirred rapidly at 95° C. while there was added dropwise thereto 150 parts of concentrated hydrochloric acid during the course of thirty-five minutes. After all of the acid had been added, the resulting mixture was heated for twenty minutes longer at 95° C. with constant stirring. It was then cooled and permitted to form layers. The oil layer was separated, washed with water, dried, and distilled in vacuo. The desired product distilled at 96°–107° C./5 mm. as a pale yellow liquid in a yield of 170 parts, or 72% of theory. Upon redistillation, the pure compound, 2-methyl-2-thiocyanopentanone-4,

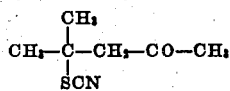

boiling at 98°–100° C./9 mm., was obtained. It is an almost colorless oil which, upon standing in the air and sunlight, gradually turns reddish. It decomposes upon distillation at atmospheric pressure.

*Example 2*

To a rapidly stirred mixture of 138 parts of phorone, 152 parts of ammonium thiocyanate, and 150 parts of water heated at 95° C., there was gradually added 200 parts of concentrated hydrochloric acid during the course of one hour, during which time the reaction temperature was maintained at 95°–98° C. The mixture was stirred for an additional half hour at 95° C. after all of the hydrochloric acid had been added. The reaction mixture was filtered hot and an oil layer separated therefrom. This was washed several times with water and dried in vacuo on a steam bath. The residual oil, which amounted to 215 parts, was distilled in vacuo, yielding two main fractions as follows:

(I) The fraction passing over at 120°–135° C./5 mm. amounted to 128 parts. Upon redistillation in vacuo, it yielded the pure compound as a pale yellow oil boiling at 104°–107° C./1 mm. and having the formula:

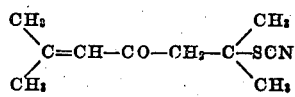

(II) The fraction boiling at 140°–155° C./1-2 mm. was a reddish yellow oil, amounting to 56 parts. Upon redistillation in vacuo, it yielded the pure compound as a pale reddish oil boiling at 150°–155° C./1 mm. and having the formula:

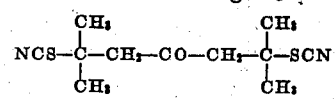

*Example 3*

Concentrated hydrochloric acid (60 parts) was added dropwise during the course of one hour to a rapidly stirred and heated mixture of 75 parts of water, 48.5 parts of sodium thiocyanate, and 76 parts of 5-ethyl-3-heptene-one-2,

CH₂CH₂—CH(C₂H₅)CH=CH—CO—CH₃ at 95° C. The mixture was stirred for thirty minutes longer at 95° C. after all of the hydrochloric acid had been added. The product was washed with water and dried in vacuo on a steam bath, yielding 98 parts of crude product as a thick oil. This oil was distilled in vacuo, yielding 76 parts of 5-ethyl-4-thiocyano-heptanone-2,

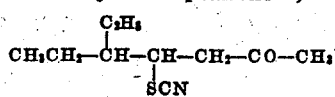

as an almost colorless oil boiling at 105°–106° C./1.5 mm.

The 5-ethyl-3-heptene-one-2 used above is a colorless oil boiling at 77°–79° C./13 mm., prepared by condensing diethyl acetaldehyde with acetone in the presence of boiling aqueous barium hydroxide solution.

*Example 4*

A mixture of 98.5 parts of 5-ethyl-3-nonene-one-2, 50 parts of water, and 48.5 parts of sodium thiocyanate was heated at 95° C. and stirred rapidly while 60 parts of concentrated hydrochloric acid was added dropwise during the course of one hour. The mixture was then stirred at 95° C. for twenty-five minutes. The product was washed with water and dried in vacuo on a steam bath. The residual oil was distilled in vacuo, yielding 80 parts of pure 5-ethyl-4-thiocyano-nonanone-2,

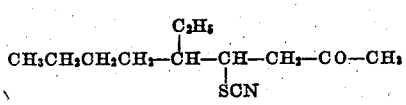

as a faintly yellow oil boiling at 122°–123° C./1 mm.

The 5-ethyl-3-nonene-one-2 used above is a colorless oil boiling at 119°–123° C./22 mm., prepared by condensing 2-ethyl-hexylaldehyde with acetone in the presence of aqueous barium hydroxide solution.

*Example 5*

A mixture of 58.5 parts of 3-nonene-one-2, 36.4 parts of sodium triocyanate, and 37 parts of water was heated on a steam bath to 95° C. and stirred rapidly. Concentrated hydrochloric acid (45 parts) was added dropwise to the stirred mixture at 95° C. during the course of one hour. The mixture was then stirred for an additional twenty-five minutes at 95° C. and was finally washed, dried, and distilled in vacuo.

The 4-thiocyano-nonanone-2,

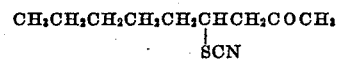

came over between 100° and 120° C./2 mm. as a pale yellow oil in a yield of 50 parts. Upon redistillation in vacuo, the pure compound boiled at 109°–112° C./1.5 mm.

*Example 6*

Concentrated hydrochloric acid (70 parts) was added dropwise during the course of fifty minutes to a stirred solution of 105 parts of cyclohexylidene cyclohexanone, 56.7 parts of sodium thiocyanate, 60 parts of ethanol, and 60 parts of water at 90° C. The resulting mixture was then heated for forty-five minutes longer at 90° C. It was mixed with water and an oil layer was separated, washed, and dried in vacuo at 95° C. The yield of crude product was 130 parts. Upon distillation in vacuo, the cyclohexylidene cyclohexanone hydrothiocyanate obtained, having the formula:

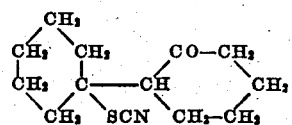

undergoes partial decomposition unless distilled in small quantities. The pure compound is a pale yellow oil boiling at 150°–155° C./1.5-2 mm., having the following constants: $n_D^{25}$ 1.5473; $d_4^{25}$ 1.0997.

Example 7

A mixture of 40 parts of isohexylidene cyclohexanone, 24.3 parts of sodium thiocyanate, 30 parts of water, and 30 parts of ethanol was stirred at 90° C. while there was gradually added 30 parts of concentrated hydrochloric acid during the course of twenty-five minutes. The mixture was then stirred for forty-five minutes longer at 90° C. and was finally washed and dried in vacuo. The crude product, amounting to 42 parts, was a clear dark-brown oil containing 10.6% of sulfur by analysis, corresponding to about an 80% content of the thiocyanate having the formula:

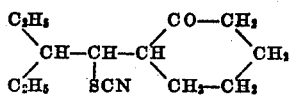

Upon distillation in vacuo, the product undergoes some decomposition. The pure product is a pale yellow oil boiling at 142° C./1.5 mm.

Example 8

To a clear solution of 138 parts of isophorone, 121 parts of sodium thiocyanate, 121 parts of water, and 121 parts of ethanol, there was gradually added, with stirring, 150 parts of concentrated hydrochloric acid at 90° C. during the course of forty minutes. The mixture was then heated for thirty minutes at 90° C. and poured into 500 parts of water. The separated oil layer was removed, washed several times with water, filtered from a small amount of solid material, and dried in vacuo at 100° C.

The product obtained was a pale-brown thin oil containing approximately 50% by weight of isophorone hydrothiocyanate having the formula:

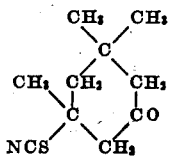

Upon distillation in vacuo at 5 mm., it almost completely decomposes.

The β-thiocyano ketones which are prepared according to the above described procedures are prepared by reacting a ketone having in its structure the grouping

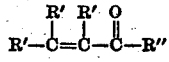

to give the grouping

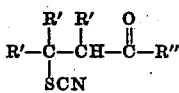

wherein R' represents hydrogen or a hydrocarbon group, including hydrocarbon chains forming cycles, and R'' also represents a hydrocarbon group. These compounds are useful as insecticides and as solvents. The β-thiocyano ketones are relatively stable compounds, resisting hydrolysis in aqueous systems and having considerable thermal stability.

I claim:

1. As a new compound, an addition product of thiocyanic acid and an aliphatic ketone having a double bond between carbon atoms in the α,β-position, said product being a β-thiocyano ketone.

2. As a new compound, an addition product of thiocyanic acid and mesityl oxide having the formula:

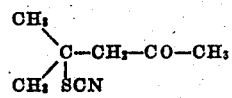

3. As a new compound, an addition product of thiocyanic acid and phorone having the formula:

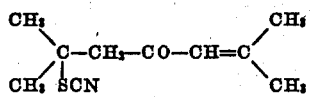

4. As a new compound, an addition product of thiocyanic acid and 5-ethyl-3-nonene-one-2 having the formula:

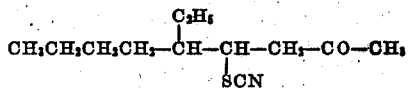

5. A method for preparing β-thiocyano ketones which comprises reacting by addition at a temperature above room temperature up to about 100° C. a ketone having a double bond between carbon atoms in the α,β-position and nascent thiocyanic acid in an aqueous medium, said thiocyanic acid being gradually liberated in the reaction mixture by the action of a non-oxidizing mineral acid upon a salt of thiocyanic acid.

6. A method for preparing β-thiocyano ketones which comprises reacting by addition at a temperature above 30° C. up to about 100° C. an aliphatic ketone having a double bond between carbon atoms in the α,β-position and nascent thiocyanic acid in an aqueous medium, said thiocyanic acid being gradually liberated in the reaction mixture by the action of a non-oxidizing mineral acid upon a salt of thiocyanic acid.

7. A method for preparing 2-methyl-2-thiocyano-pentanone-4 which comprises reacting by addition at a temperature above 30° C. up to about 100° C. mesityl oxide and nascent thiocyanic acid in an aqueous medium, said thiocyanic acid being gradually liberated in the reaction mixture by the action of a non-oxidizing mineral acid upon a salt of thiocyanic acid.

8. A method for preparing 2,6-dimethyl-2-thiocyano-5-heptenone-4 which comprises reacting by addition at a temperature above 30° C. up to about 100° C. phorone and nascent thiocyanic acid, said thiocyanic acid being gradually liberated in the reaction mixture by the action of a non-oxidizing mineral acid upon a salt of thiocyanic acid.

9. A method for preparing 5-ethyl-4-thiocyano-heptenone-2 which comprises reacting by addition at a temperature above 30° C. up to about 100° C. 5-ethyl-3-heptenone-2 and nascent thiocyanic acid, said thiocyanic acid being gradually liberated in the reaction mixture by the action of a non-oxidizing mineral acid upon a salt of thiocyanic acid.

HERMAN A. BRUSON.